United States Patent
Bartov et al.

(10) Patent No.: US 11,575,643 B2
(45) Date of Patent: *Feb. 7, 2023

(54) SYSTEM AND METHOD FOR MANAGING NETWORK CONNECTED DEVICES

(71) Applicant: Axonius Solutions Ltd., Tel Aviv (IL)

(72) Inventors: Avidor Bartov, Tel-Aviv (IL); Itay Weiss, Holon (IL); Ofri Shur, Kfar Saba (IL); Dean Sysman, New York, NY (US); Shmuel Ur, Shorashim (IL)

(73) Assignee: Axonius Solutions Ltd., Tel-Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/346,335

(22) Filed: Jun. 14, 2021

(65) Prior Publication Data

US 2021/0306298 A1 Sep. 30, 2021

Related U.S. Application Data

(63) Continuation of application No. 16/861,253, filed on Apr. 29, 2020, now Pat. No. 11,063,904, which is a
(Continued)

(51) Int. Cl.
*H04L 15/16* (2006.01)
*G06F 15/16* (2006.01)
(Continued)

(52) U.S. Cl.
CPC .......... *H04L 61/3025* (2013.01); *H04L 67/06* (2013.01); *H04L 67/1097* (2013.01)

(58) Field of Classification Search
CPC . H04L 61/3025; H04L 67/06; H04L 67/1097; H04L 61/4505
(Continued)

(56) References Cited

U.S. PATENT DOCUMENTS

| | | |
|---|---|---|
| 6,205,563 B1 * | 3/2001 | Lewis ................ H04L 41/0631 714/48 |
| 9,891,907 B2 | 2/2018 | Searle et al. |

(Continued)

FOREIGN PATENT DOCUMENTS

| | | | |
|---|---|---|---|
| CA | 2569820 C * | 10/2009 | ........... G05B 19/056 |
| WO | WO-2005048137 A2 * | 5/2005 | ....... G06F 17/30876 |

(Continued)

OTHER PUBLICATIONS

Notice of Allowance & Interview Summary dated Mar. 16, 2021 from the US Patent and Trademark Office Re. U.S. Appl. No. 16/861,253. (18 pages).
(Continued)

*Primary Examiner* — David R Lazaro
*Assistant Examiner* — Berhanu Shitayewoldetadik

(57) ABSTRACT

A system for managing network connected devices, comprising at least one hardware processor adapted to produce a plurality of unique device descriptors, each describing one of a plurality of network connected devices, by: for each of a plurality of device descriptors, each having a plurality of supported actions, and one or more domain device identifiers, each identifier associating the device descriptor with one of a plurality of management domains: for each of the plurality of management domains not associated with the device descriptor: instructing execution on a network connected device described by the device descriptor a domain identification query according to the descriptor's plurality of supported actions, to determine a new domain device identifier; identifying in the plurality of device descriptors a second device descriptor having a domain device identifier equal to the new domain device identifier; and merging the device descriptor with the second device descriptor.

13 Claims, 6 Drawing Sheets

Related U.S. Application Data continuation of application No. 16/150,312, filed on Oct. 3, 2018, now Pat. No. 10,652,208.

(51) Int. Cl.

| | |
|---|---|
| *H04L 9/00* | (2022.01) |
| *G06F 15/173* | (2006.01) |
| *G06F 21/00* | (2013.01) |
| *H04L 29/12* | (2006.01) |
| *H04L 29/08* | (2006.01) |
| *H04L 61/3015* | (2022.01) |
| *H04L 67/06* | (2022.01) |
| *H04L 67/1097* | (2022.01) |

(58) Field of Classification Search
USPC .......................................................... 709/245
See application file for complete search history.

(56) References Cited

U.S. PATENT DOCUMENTS

| | | | |
|---|---|---|---|
| 9,967,228 B2* | 5/2018 | Logue ................... | H04L 67/06 |
| 10,361,966 B2 | 9/2019 | Gausman | |
| 2005/0053060 A1* | 3/2005 | Pettey ................. | H04L 67/1001 |
| | | | 370/385 |
| 2005/0132229 A1* | 6/2005 | Zhang ................... | H04L 63/083 |
| | | | 726/4 |
| 2006/0031493 A1 | 2/2006 | Cugi | |
| 2007/0174720 A1 | 7/2007 | Kubo et al. | |
| 2007/0192474 A1 | 8/2007 | Decasper et al. | |
| 2007/0288239 A1 | 12/2007 | Russell | |
| 2008/0109575 A1 | 5/2008 | Dries et al. | |
| 2008/0235383 A1* | 9/2008 | Schneider ............... | H04L 61/30 |
| | | | 709/229 |
| 2009/0113400 A1 | 4/2009 | Pelleg et al. | |
| 2009/0228566 A1* | 9/2009 | Sharp .................... | H04L 51/224 |
| | | | 709/227 |
| 2010/0235469 A1 | 9/2010 | Morris | |
| 2010/0313197 A1 | 12/2010 | Cho et al. | |
| 2011/0010721 A1* | 1/2011 | Gupta .................. | G06F 9/5077 |
| | | | 718/1 |
| 2011/0106782 A1* | 5/2011 | Ke ....................... | G06F 16/5838 |
| | | | 707/E17.02 |
| 2012/0102173 A1 | 4/2012 | Slavitch et al. | |
| 2012/0151117 A1 | 6/2012 | Tuch et al. | |
| 2012/0167226 A1* | 6/2012 | Van Gestel et al. .. | H04L 63/104 |
| | | | 709/223 |
| 2012/0210301 A1 | 8/2012 | Crisp | |
| 2013/0304872 A1* | 11/2013 | Flynn .................... | G06F 11/108 |
| | | | 709/219 |
| 2014/0006804 A1 | 1/2014 | Tkacik et al. | |
| 2014/0019590 A1 | 1/2014 | Piernot et al. | |
| 2014/0068259 A1* | 3/2014 | Resch ................... | H03M 13/611 |
| | | | 713/189 |
| 2014/0068320 A1* | 3/2014 | Vedpathak ............ | G06F 11/142 |
| | | | 714/6.2 |
| 2014/0068791 A1* | 3/2014 | Resch ................. | G06F 11/2094 |
| | | | 726/30 |
| 2014/0089419 A1 | 3/2014 | Morris | |
| 2014/0149591 A1 | 5/2014 | Bhattacharya et al. | |
| 2014/0179313 A1* | 6/2014 | Orton .................... | H04W 4/029 |
| | | | 455/456.2 |
| 2014/0208434 A1* | 7/2014 | Brouwer ............... | G06F 16/275 |
| | | | 726/26 |
| 2014/0280433 A1* | 9/2014 | Messerli ................ | H04L 67/10 |
| | | | 709/201 |
| 2015/0242066 A1 | 8/2015 | Chen | |
| 2015/0326469 A1* | 11/2015 | Kern .................... | H04L 12/4641 |
| | | | 370/254 |
| 2015/0378825 A1* | 12/2015 | Resch ................. | G06F 21/6272 |
| | | | 714/766 |
| 2016/0094398 A1 | 3/2016 | Choudhury et al. | |
| 2016/0103911 A1* | 4/2016 | Logue .................. | G08B 25/001 |
| | | | 707/695 |
| 2016/0197880 A1 | 7/2016 | Korman et al. | |
| 2016/0198365 A1* | 7/2016 | Rajagopalan ......... | H04W 36/22 |
| | | | 455/453 |
| 2016/0254968 A1* | 9/2016 | Ebtekar ................ | H04L 67/568 |
| | | | 709/223 |
| 2016/0306879 A1* | 10/2016 | Logue ...................... | F24F 11/30 |
| 2016/0313926 A1* | 10/2016 | Mutha .................... | G06F 3/0652 |
| 2016/0323268 A1* | 11/2016 | Von Bokern ........ | H04L 63/0823 |
| 2017/0168692 A1* | 6/2017 | Chandra ................ | H04L 51/04 |
| 2017/0220463 A1* | 8/2017 | Malina ................. | G06F 11/3409 |
| 2017/0286698 A1* | 10/2017 | Shetty ................ | G06F 21/6218 |
| 2018/0007516 A1 | 1/2018 | Ge et al. | |
| 2018/0091517 A1 | 3/2018 | Fury Christ et al. | |
| 2018/0096136 A1* | 4/2018 | LeMay .................. | G06F 12/00 |
| 2018/0152278 A1 | 5/2018 | Chen et al. | |
| 2018/0173869 A1* | 6/2018 | Von Bokern ............ | G06F 21/44 |
| 2018/0242028 A1 | 8/2018 | Van Brandenburg et al. | |
| 2018/0366221 A1* | 12/2018 | Crehore ................ | G06F 16/211 |
| 2019/0036916 A1* | 1/2019 | Von Bokern .......... | H04L 41/046 |
| 2019/0110207 A1 | 4/2019 | Makhijani et al. | |
| 2019/0208234 A1 | 7/2019 | Van Brandenburg et al. | |
| 2019/0294780 A1 | 9/2019 | Melamed et al. | |
| 2019/0303324 A1 | 10/2019 | Lantz et al. | |
| 2020/0112541 A1 | 4/2020 | Bartov et al. | |
| 2020/0259787 A1 | 8/2020 | Bartov et al. | |

FOREIGN PATENT DOCUMENTS

| | | | | |
|---|---|---|---|---|
| WO | WO-2014099687 A1 * | 6/2014 | ......... | G06F 16/2255 |
| WO | WO-2014100781 A1 * | 6/2014 | .......... | H04L 41/046 |
| WO | WO-2015075933 A1 * | 5/2015 | .......... | G06F 3/0346 |
| WO | WO 2015/120709 | 8/2015 | | |
| WO | WO-2016057548 A1 * | 4/2016 | .............. | F24F 11/30 |

OTHER PUBLICATIONS

Notice of Allowance dated Mar. 19, 2020 from the US Patent and Trademark Office Re. U.S. Appl. No. 16/150,312. (6 pages).
Official Action dated Dec. 19, 2019 From the US Patent and Trademark Office Re. U.S. Appl. No. 16/150,312. (28 pages).

\* cited by examiner

SYSTEM AND METHOD FOR MANAGING NETWORK CONNECTED DEVICES

RELATED APPLICATIONS

This application is a continuation of U.S. patent application Ser. No. 16/861,253 filed on Apr. 29, 2020, which is a continuation of U.S. patent application Ser. No. 16/150,312 filed on Oct. 3, 2018, now U.S. Pat. No. 10,652,208. The contents of the above applications are all incorporated by reference as if fully set forth herein in their entirety.

FIELD AND BACKGROUND OF THE INVENTION

The present invention, in some embodiments thereof, relates to a system for managing network connected devices and, more specifically, but not exclusively, to a system for managing network connected devices associated with a plurality of management domains.

As use herein, the terms "network connected device" and "endpoint device" each refer to an entity connected to a digital communication network and having an identifier unique within a management domain. Some examples of a network connected device are a computer, a network device, such as a router, and a virtual machine, executed by a host machine. Some additional examples of a network connected device are a computer peripheral device, such as a printer, and a nonstandard computing device that connects to a network and has an ability to transmit data (commonly known as an Internet Of Things device), such as a thermostat, a light bulb controller, and an electrical switch. Some examples of a management domain are device deployment and security.

For brevity, the term "device" is used herein to mean "network connected device" and additionally or alternately "endpoint device", and the three terms are used interchangeably.

A network connected device may be associated with one or more management domains. For example, a virtual machine may be managed by a virtual machine service manager or monitor such as VmWare ESXi or Amazon Web Services (AWS), for the purpose of deploying, executing and serving the virtual machine. In another example, a management system may provide one or more security services to a device, for example McAffee ePolicy Orchestrator (ePO) and Microsoft Active Directory. A device may be associated with one or more management domains, for example a virtual machine may be deployed and executed by AWS and domain security services for the device may be provided by Microsoft Active Directory. In another example, a device may be associated with one or more security domains.

SUMMARY OF THE INVENTION

It is an object of the present invention to provide a system and a method for managing a plurality of network connected devices.

The foregoing and other objects are achieved by the features of the independent claims. Further implementation forms are apparent from the dependent claims, the description and the figures.

According to a first aspect of the invention, a system for managing network connected devices comprises at least one hardware processor adapted to produce a plurality of unique device descriptors, each describing one of a plurality of network connected devices, by: for each of a plurality of device descriptors, each having a plurality of supported actions, and one or more domain device identifiers, each identifier associating the device descriptor with one of a plurality of management domains: for each of the plurality of management domains not associated with the device descriptor: instructing execution on a network connected device described by the device descriptor a domain identification query according to the descriptor's plurality of supported actions, to determine a new domain device identifier; identifying in the plurality of device descriptors a second device descriptor having a domain device identifier equal to the new domain device identifier; and merging the device descriptor with the second device descriptor.

According to a second aspect of the invention, A method for managing network connected devices comprises: producing a plurality of unique device descriptors, each describing one of a plurality of network connected devices, by: for each of a plurality of device descriptors, each having a plurality of supported actions, and one or more domain device identifiers, each identifier associating the device descriptor with one of a plurality of management domains: for each of the plurality of management domains not associated with the device descriptor: instructing execution on a network connected device described by the device descriptor a domain identification query according to the descriptor's plurality of supported actions, to determine a new domain device identifier; identifying in the plurality of device descriptors a second device descriptor having a domain device identifier equal to the new domain device identifier; and merging the device descriptor with the second device descriptor.

Using the descriptor's plurality of supported actions may facilitate detecting an association between the network connected device and management device that does not support some of the plurality of supported actions, and thus may facilitate reducing cost of operation of a system comprising the network connected device by enabling elimination of some superfluous management entities, for example more than one device descriptor describing the network connected device.

With reference to the first and second aspects, in a first possible implementation of the first and second aspects of the present invention, the system further comprises at least one digital communication network interface connected to the at least one hardware processor; and the at least one hardware processor is adapted to instructing execution on the network connected device via the at least one digital communication network interface.

With reference to the first and second aspects, in a second possible implementation of the first and second aspects of the present invention, the at least one hardware processor is further adapted to requesting at least one domain identification query executable software object from at least one domain administrator; and instructing execution of the domain identification query comprises instructing the network connected device to execute the at least one domain identification query executable software object. Using at least one domain identification query executable software object from at least one domain administrator may facilitate associating the network connected device with at least one management domain associated with the at least one domain administrator. When the device descriptor associates the network connected device with at least one other management domain and not with the at least one management domain, using the at least one domain identification query software object from the at least one domain manager may facilitate reducing cost of operation of a system comprising the network connected device by enabling elimination of more than one device descriptor describing the network connected device.

With reference to the first and second aspects, in a third possible implementation of the first and second aspects of the present invention, instructing execution on the network connected device comprises sending at least one identification request message to the network connected device; the at least one hardware processor is further adapted to sending to at least one domain administrator at least part of an identification response message received from the network connected device in response to the at least one identification request message; and the at least one hardware processor determines the new domain device identifier by analyzing a domain identifier response received from the at least one domain administrator in response to the at least part of the identification response message. Sending at least part of the identification response message received from the network connected device to at least one domain administrator may allow decoding an encoded domain device identifier thus facilitating identification of more than one device descriptor describing the network connected device.

With reference to the first and second aspects, in a fourth possible implementation of the first and second aspects of the present invention, at least one of the device descriptor's plurality of supported actions is selected from a group consisting of: retrieve a file from storage of a network connected device, store a file on storage of a network connected device, delete a file from storage of a network connected device, execute a textual executable software object, execute a binary executable software object, and modify a hardware configuration.

With reference to the first and second aspects, in a fifth possible implementation of the first and second aspects of the present invention, the at least one hardware processor is further adapted to storing the plurality of device descriptors on a non-volatile digital storage connected to the at least one hardware processor.

With reference to the first and second aspects, in a sixth possible implementation of the first and second aspects of the present invention, instructing execution of the domain identification query comprises: instructing execution of at least one first operation according to at least one first supported action; and instructing execution of at least one second operation according to at least one second supported action. Using a plurality of supported actions may facilitate identifying more than one device descriptor describing the network device. As the first supported action may be granted by one management domain and the second supported action may be granted by another management domain, using a plurality of supported actions may further facilitate identification of more than one device descriptor describing the network device, not possible when using only one or more supported actions granted by a management domain. Optionally, the at least one first operation comprises creation of a new network interface object; and the at least one second operation comprises configuring the new network interface object. Optionally, the network connected device comprises a storage; the at least one first operation comprises writing to the storage a file comprising at least one device identifier value; and the at least one second operation comprises retrieving the file from the storage. With reference to the first and second aspects, in a seventh possible implementation of the first and second aspects of the present invention, the at least one hardware processor determines the new domain device identifier by analyzing at least one message received from the network connected device. Optionally, execution of the domain identification query by the network connected device comprises executing at least one identification query executable software object; and the at least one message received from the network connected device comprises an output of executing the at least one identification query executable software object. Optionally, the at least one identification query executable software object is an executable binary file or an executable script file. Optionally, instructing execution of the domain identification query comprises sending the network connected device at least one instruction message comprising at least one Uniform Resource Identifier (URI); and the at least one message received from the network connected device comprises at least one resource response output of executing the domain identification query using the at least one URI.

With reference to the first and second aspects, of the seventh implementation of the first and second aspects, in an eighth possible implementation of the first and second aspects of the present invention, instructing execution on the network connected device comprises instructing modification of at least one network parameter value of the network connected device; the at least one hardware processor is further adapted to sending at least one request message to the network connected device after instructing modification of the at least one network parameter value; and the at least one message received from the network connected device comprises at least one response to the at least one request message. Modifying at least one network parameter value, for example by modifying the at least one network parameter to at least one predefined parameter value, may watermark network activity of a network connected device and thus may facilitate associating the network connected device with one or more management domains, and thus may facilitate elimination of one or more device descriptors describing the network connected device.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
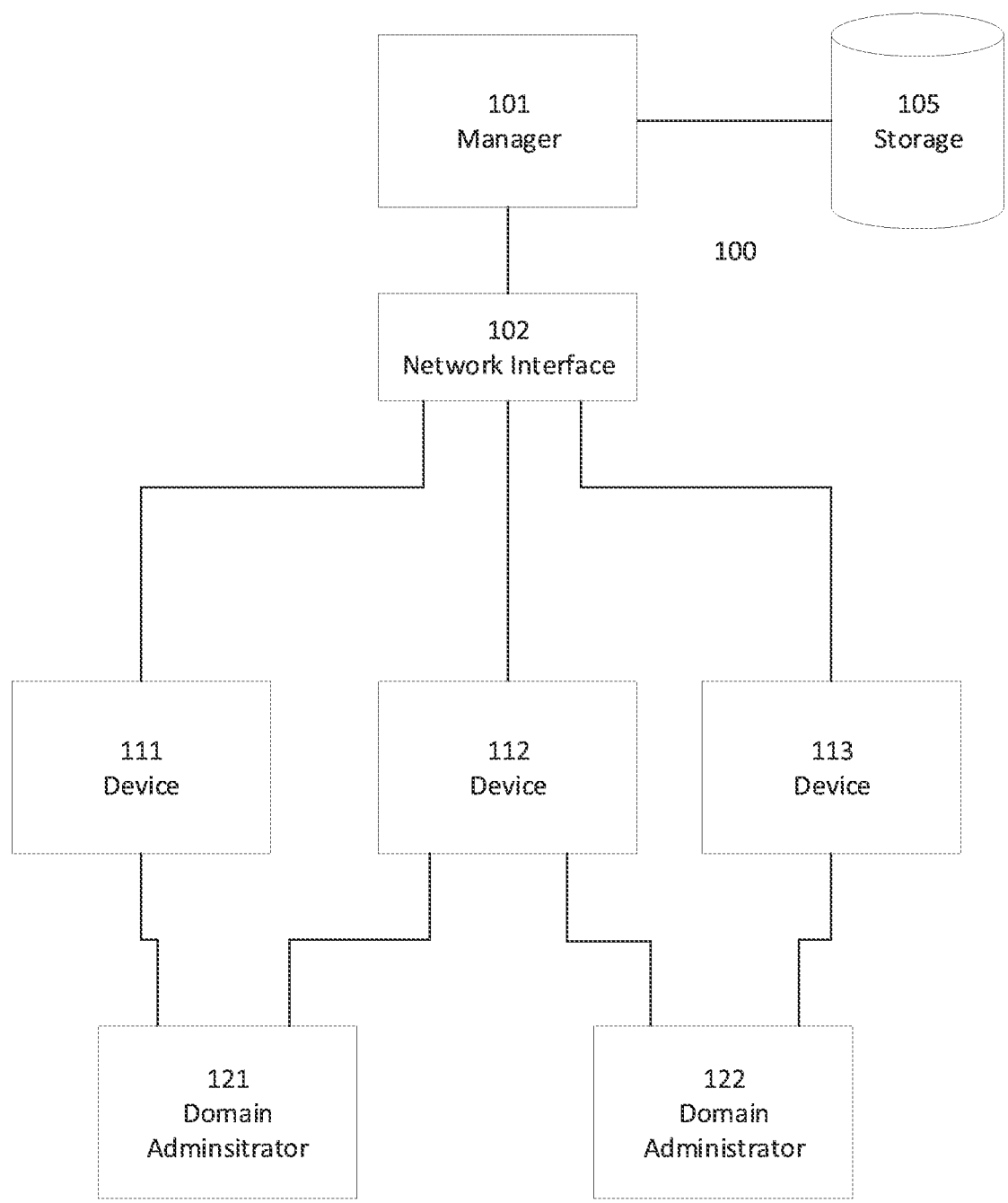
FIG. 1 is a schematic block diagram of an exemplary system, according to some embodiments of the present invention.

The present invention, in some embodiments thereof, relates to a system for managing network connected devices and, more specifically, but not exclusively, to a system for managing network connected devices associated with a plurality of management domains.

It is common practice for a device to have a domain device identifier, uniquely identifying the device with a management domain. When a device is associated with a plurality of management domains, the device may have a plurality of domain device identifiers, each associated with one of the plurality of management domains. However, a first domain device identifier, identifying the device in a first management domain, may be different from a second domain device identifier identifying the device in a second management domain.

In a networked system comprising a plurality of network connected devices, there may be a need to identify unique endpoint devices. A media access controller (MAC) address is not sufficient as a device may have more than one MAC address. In some management domains, a domain administrator of the management domain provides a list of domain device identifiers of a plurality of devices associated with the management domain. An example of a domain administrator is at least one administration hardware processor executing domain administration software. In some other management domains, the domain administrator provides a query for execution on a device to retrieve the device's domain device identifier related to the management domain. For example, in the AWS management domain there is an identified AWS instance identification Universal Resource Identifier (URI), where executing an AWS identification query that accesses the identified AWS instance identification URI produces an output comprising a machine identifier of the device. A URI is a string of characters designed for unambiguous identification of a resource. However, as a device may be associated with more than one management domain, combining more than one list of domain device identifiers, each list related to one of more than one management domains, may result in a device appearing in the combined list more than once, with more than one domain device identifier.

In some management domains, a device has one or more supported actions which the device is allowed to execute according to the management domain. Examples of a supported action are retrieving a file from storage of the device (get file), storing a file on storage of the device (put file), deleting a file from storage of the device (delete file), executing a textual executable software object (run shell), executing a binary executable software object (run binary), and modification of a virtual machine's hardware configuration (alter hardware). It may be the case that a device associated with more than one management domains, supports a first plurality of actions via a first management domain and supports a second plurality of actions via a second management domain. For example, a virtual machine, executed by a VmWare ESXi hypervisor and associated with a Microsoft Active Directory service, may support hardware alteration via the VmWare ESXi management domain, and retrieving, storing, and deletion of a file as well as execution of an executable software object via the Microsoft Active Directory service.

The present invention, in some embodiments thereof, proposes using one or more capabilities, granted by a device's association with a first management domain, to associate the device with a second management domain. In such embodiments, the present invention proposes using one or more domain identification queries, provided by a first domain administrator of a first management domain, to identify an association between a first device associated with the first management domain and a second management domain. Optionally, the first domain administrator is associated with the first management domain. In addition, the present invention proposes, in some embodiments thereof, using a first device's supported action of the second management domain to execute the one or more domain identification queries of the first management domain. Executing on a first device one or more domain identification queries of a first management domain using a supported action of a second management domain may facilitate identifying the first device as a second device known to be associated with the first management domain, thus eliminating an identification of the first device and the second device as separate devices. For example, a first device associated with a Microsoft Active Directory service may support execution of an executable software object via the Microsoft Active Directory. A manager may instruct execution of the AWS identification query on the first device via the Microsoft Active Directory service. Optionally, the output of executing the AWS identification query on the first device comprises an AWS machine identifier of the first device. The manager may determine that a second device, associated with AWS and having the first device's AWS machine identifier, is the first device. Identifying a plurality of unique endpoints (unique devices) in a plurality of devices and eliminating duplicate devices may reduce cost of operation of managing the plurality of devices, for example by reducing an amount of storage required to store data regarding the plurality of devices, or reducing an amount of power and/or an amount of time and/or an amount of computation resources required to perform a management operation on each of the plurality of devices by reducing an amount of times the management operation is executed on a single device. An example of a management operation is installation of an operating system update or execution of a management query. In addition, reducing an amount of times the management operation is executed on the single device may reduce a negative impact on an amount of resources of the single device and/or stability of the single device as it may be the case that executing a management operation more than once has one or more undesirable side effects on the single device. Some examples of an undesirable side effect are consuming additional resources, such as storage, with no functional advantage, and rendering some operation parameters of the single device inconsistent.

Optionally, a plurality of device descriptors is maintained, each descriptor describing one of a plurality of network connected devices. Identifying the first device as the second device may allow merging a first descriptor describing the first device with a second descriptor describing the second device, reducing an amount of device descriptors describing a single device. In addition, merging the first descriptor with the second descriptor may facilitate identifying a unified set of actions supported by the single device, allowing execution on the single device of one or more management operations requiring at least one action of a first management domain and at least one action of a second management domain. For example, a management operation may require an ability to read and write a file to a device and an ability to execute a command using the file. Some management domains, for example Active Directory, allow reading and writing a file but do not allow executing a command. Some other management domains, for example Cynet 360, allow executing a command on the device but do not support reading or writing a file. Identifying that the single device is associated with both Active Directory and Cynet 360 may facilitate performing a management operation using both writing a file and executing a command, not possible without eliminating duplication between the first descriptor and the second descriptor of the single device.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic block diagram of an exemplary system 100, according to some embodiments of the present invention. In such embodiments, at least one hardware processor 101 is connected to one or more network connected devices, for example network connected device 111, network connected device 112 and network connected device 113. Examples of a network connected device are a computer, a mobile computer, a network device such as a router, and a virtual machine executing on a host machine. For brevity, henceforth the term "manager" means "at least one hardware processor". Optionally, network connected device 111, network connected device 112 and network connected device 113 are connected to manager 101 via at least one digital communication network. Optionally, the digital communication network is a Local Area Network (LAN), for example an Ethernet network or a wireless network. Optionally, the digital communication network is a Wide Area Network (WAN), for example the Internet. Optionally, manager 101 is connected to at least one digital communication network interface 102 for the purpose of connecting to network connected device 111, network connected device 112 and network connected device 113 via the at least one digital communication network.

Optionally, some of the one or more network devices are associated with one of a plurality of management domains. Optionally, system 100 comprises one or more domain administrators, each associated with one of the plurality of management domains. For example, domain administrator 121 may be associated with a first management domain of the plurality of management domains and domain administrator 122 may be associated with a second management domain of the plurality of management domains. Some examples of a management domain are Microsoft Active Directory, AWS, VmWare ESXi, and McAfee ePO. Optionally, some of the one or more domain administrators are connected to some of the one or more network connected devices, optionally via at least one other digital communication network. For example, network connected device 111 and network connected device 112 are optionally associated with the first management domain of the plurality of management domains and may be connected to domain administrator 121. Optionally, network connected device 112 and network connected device 113 are associated with the second management domain of the plurality of management domains and may be connected to domain administrator 122.

Optionally, one or more of the plurality of network connected devices each have a storage. Example of a storage are a random access memory and a hard disk. Optionally, network connected device 112 has a storage.

Optionally, manager 101 is connected to at least one non-volatile digital storage 105 for the purpose of storing a plurality of device descriptors, each describing one of the one or more network connected devices, for example network connected device 111, network connected device 112 and network connected device 113. Some examples of a non-volatile digital storage are a magnetic hard disk, a solid state hard disk, a non-volatile random access memory (NVRAM), a network connected storage and a storage network.

Figure 2:
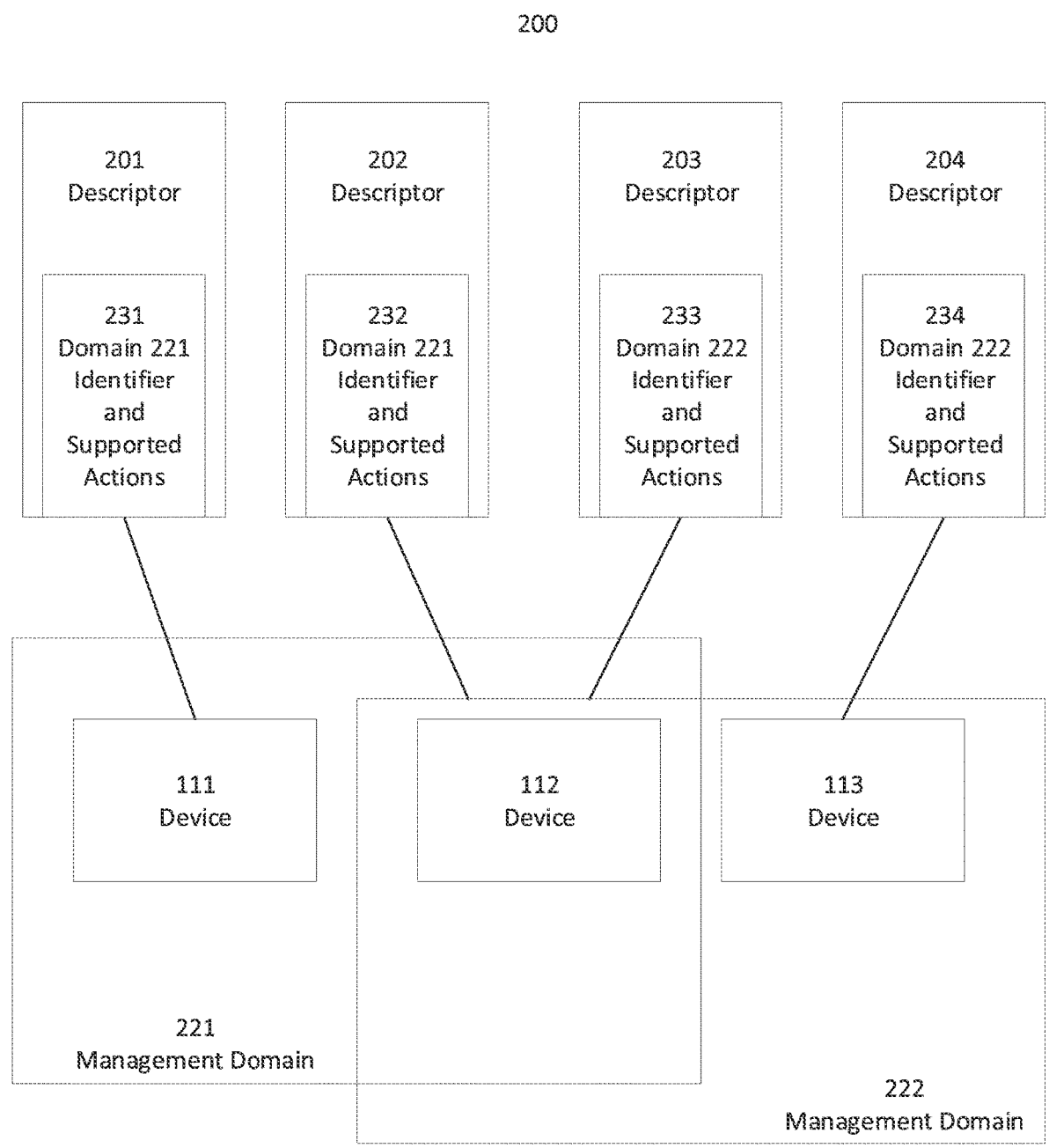
FIG. 2 is a schematic illustration of an exemplary plurality of device descriptors, according to some embodiments of the present invention.

Reference is now made also to FIG. 2, showing a schematic illustration of an exemplary plurality of device descriptors 200, according to some embodiments of the present invention. In such embodiments, network connected device 111 and network connected device 112 are associated with management domain 221. Optionally, network connected device 112 and network connected device 113 are associated with management domain 222. Optionally, domain administrator 121 of FIG. 1 is a domain administrator of management domain 221. Optionally, domain administrator 122 of FIG. 1 is a domain administrator of management domain 222.

Optionally, manager 101 has a plurality of device descriptors, each describing one of a plurality of network connected devices. Each device descriptor has at least one domain specific set of data, each pertaining to one of the plurality of management domains. Optionally, each of the at least one domain specific set of data comprises a domain device identifier in the respective management domain and a plurality of domain-specific supported actions pertaining to the respective management domain.

For brevity, henceforth the term "descriptor" means "device descriptor".

For example, descriptor 201 optionally describes device 111 and comprises domain specific set of data 231 pertaining to management domain 221. Optionally, descriptor 202 and descriptor 203 both describes device 112. Optionally, descriptor 202 comprises domain specific set of data 232 pertaining to management domain 221 and descriptor 203 optionally comprises domain specific set of data 233 pertaining to management domain 222. Optionally, descriptor 204 describes device 113 and comprises domain specific set of data 234 pertaining to management domain 222. According to some embodiments of the present invention, descriptors 202 and 203 may be merged as they both describe device 112.

Figure 3:
FIG. 3 is a schematic illustration of an exemplary plurality of device descriptors after merging two device descriptors, according to some embodiments of the present invention.

Reference is now made also to FIG. 3, showing a schematic illustration of an exemplary plurality of device descriptors 300 after merging two device descriptors, according to some embodiments of the present invention. In such embodiments, after merging descriptor 202 with descriptor 203, descriptor 202 comprises domain specific set of data 232 pertaining to management domain 221 and domain specific set of data 233 pertaining to management domain 222. Optionally, descriptor 203 is removed from the plurality of device descriptors. In this example, after merging descriptor 202 with descriptor 203, descriptor 201, descriptor 202 and descriptor 204 are a plurality of unique device descriptors.

To produce a plurality of unique device descriptors, in some embodiments of the present invention system 100 implements the following optional method.

Figure 4:
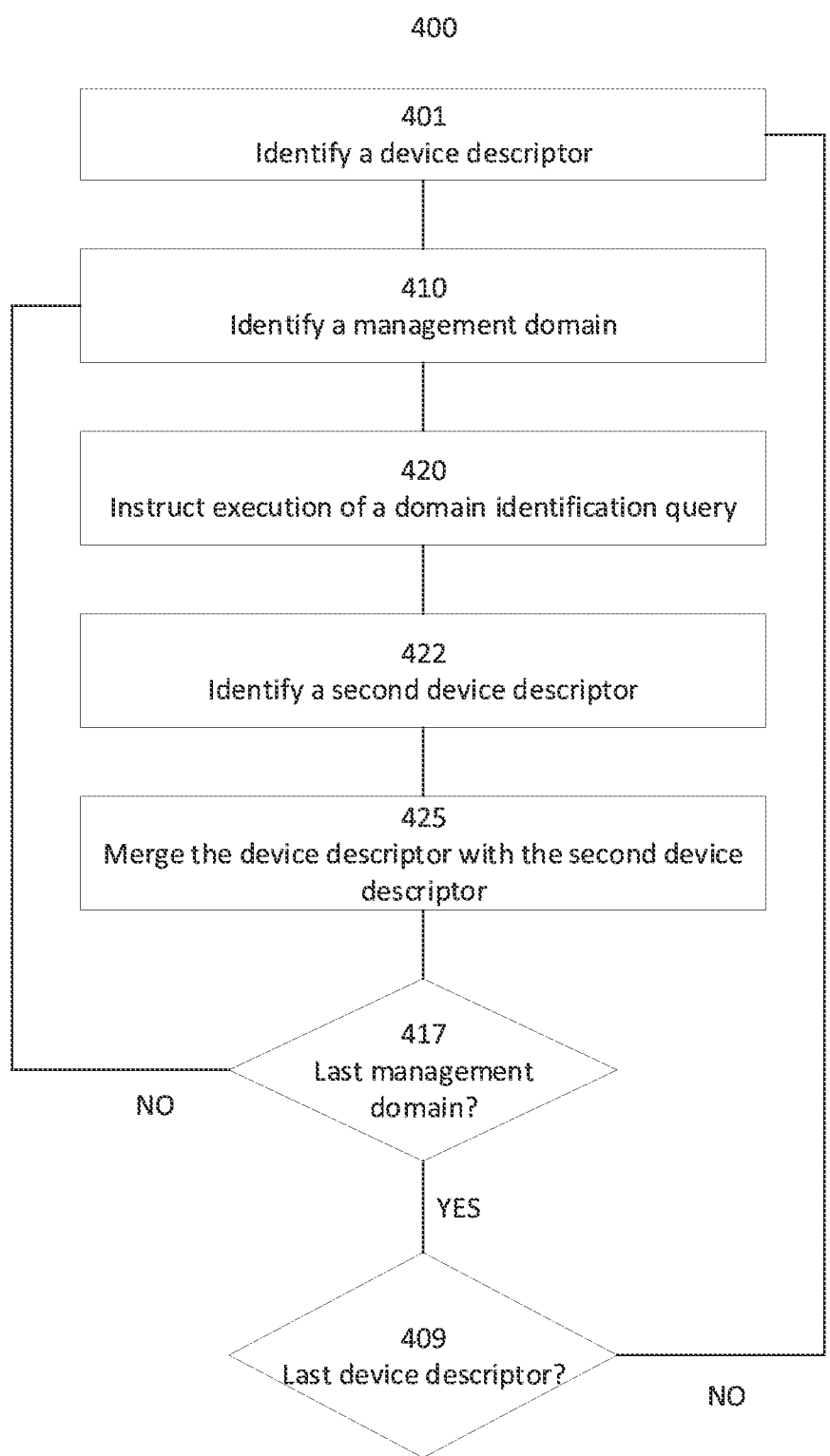
FIG. 4 is a flowchart schematically representing an optional flow of operations, according to some embodiments of the present invention.

Reference is now made also to FIG. 4, showing a flowchart schematically representing an optional flow of operations 400, according to some embodiments of the present invention. In such embodiments, to produce a plurality of unique device descriptors each describing one of a plurality of network connected devices, manager 101 identifies in 401 a device descriptor 202 of plurality of device descriptors 200, where device descriptor 202 optionally describes device 112. Optionally, device descriptor 202 comprises at least one domain device identifier, in domain specific set of data 232, associating device 112 with management domain 221. In 410, manager 101 optionally identifies management domain 222 not associated with descriptor 202, and in 420 manager 101 optionally instructs execution on device 102 of a domain identification query according to descriptor's 202 plurality of supported actions, in domain specific set of data 232, optionally to determine a new domain device identifier. Optionally the new domain device identifier associates device 112 with management domain 222.

Optionally, manager 101 instructs execution of the domain identification query on device 112 via at least one digital communication network interface 102.

Optionally, manager 101 requests at least one domain identification query executable software object script from at least one domain administrator, for example domain administrator 122. Optionally, instructing execution on device 102 of the domain identification query in 420 comprises instructing device 112 to execute the at least one domain identification query executable software object. Some examples of an executable software object are an executable binary file and an executable script file. Optionally, descriptor 202's plurality of supported actions, in domain specific set of data 232, is according to management domain 221. Optionally, in 420 manager 101 instructs execution of the domain identification query, received from domain administrator 122 of management domain 222, on device 102 according to descriptor 202's plurality of supported actions according to management domain 221, in domain specific set of data 232.

Optionally, at least one of descriptor 202's plurality of supported actions is selected from a group consisting of: "retrieve a file from storage of a device", "store a file on storage of a device", "delete a file from storage of a device", "execute a textual executable software object", "execute a binary executable software object", and "modify a hardware configuration".

Optionally, instructing execution of the domain identification query on device 112 in 420 comprises instructing execution of at least one first operation according to at least one first supported action and optionally instructing execution of at least one second operation according to at least one second supported action. An example of an operation is writing a file to device 112's storage, optionally according to a supported action "store a file on storage of a device". Optionally the written file comprises at least one device identifier value, for example an identified domain device identifier value of device 112 in management domain 222. Another example of an operation is retrieving a file from device 112's storage, optionally according to a supported action "retrieve a file from storage of a device". Optionally the retrieved file comprises the least one device identifier value, for example the identified domain device identifier value of device 112 in management domain 222. Optionally, the retrieved file was written to storage of device 112 when performing 420 for another of the plurality of device descriptors, for example for device descriptor 203, associating device 112 with management domain 222.

Another example of an operation is executing a query executable software object on device 112, optionally according to another supported action "execute a binary executable software object". Another example of an operation is creation of a new network interface object on device 112, for example when device 112 is a virtual machine, optionally according to a third supported action "modify a hardware configuration". Another example of an operation is configuration of a network interface object of device 112, optionally according to a supported operation "execute a textual executable software object".

Optionally, manager 101 determines the new domain device identifier by analyzing at least one message received from device 112. For example, when the at least one second operation comprises retrieving a file, manager 101 optionally analyzes at least one message comprising the retrieved file comprising the least one device identifier value to determine the new domain device identifier is the least one device identifier value, for example the identified domain device identifier value of device 112 in management domain 222.

Optionally, execution of the domain identification query by device 112 comprises executing at least one identification query executable software object. Some examples of an executable software object are an executable binary file and an executable script file. Optionally, the at least one message sent from device 112 to manager 101 comprises an output of executing the at least one identification query executable software object. Optionally, executing the at least one identification query executable software object on device 112 produces an output comprising the identified domain device identifier value of device 112 in management domain 222.

Optionally, instructing execution of the domain identification query on device 112 in 420 comprises sending device 112 at least one instruction message comprising at least one URI, for example AWS's identified instance-id URI. Optionally device 112 executes the domain identification query using the at least one URI. For example, manager 101 may send device 112 a script file comprising an instruction to execute a local Hyper Text Transport Protocol (HTTP) GET request using the at least one URI. In another example, manager 101 optionally sends device 112 a script file comprising an instruction to execute a power shell command using the at least one URI. In another example, manager 101 optionally sends device 112 a HTTP GET request using the at least one URI. Optionally, device 112 sends manager 101 at least one message comprising at least one resource response output of executing the domain identification query using the at least one URI. For example, when manager 101 sends device 112 the script file comprising the instruction to execute a local HTTP GET request using the at least one URI, the at least one message optionally comprises an output of executing the local HTTP GET request using the at least one URI. In another example, when manager 101 sends device 112 the HTTP GET request using the at least one URI, the at least one message optionally comprises a result of processing the HTTP GET request using the at least one URI.

In a non-limiting example, device descriptor 203, describing device 112 in management domain 222, comprises the identified domain device identifier value of device 112 in management domain 222, for example "AAA-222". In this example, device descriptor 202, describing device 112 in management domain 221, comprises the identified domain device identifier value of device 112 in management domain 221, for example "221ABC". When performing 420 for device descriptor 203, manager 101 optionally instructs writing to device 112 a file comprising the value "AAA-222", which is the identified domain device identifier value of device 112 in management domain 222. When performing 420 for device descriptor 202, manager 101 optionally retrieves determines "AAA-222" as a new domain device identifier.

Figure 5:
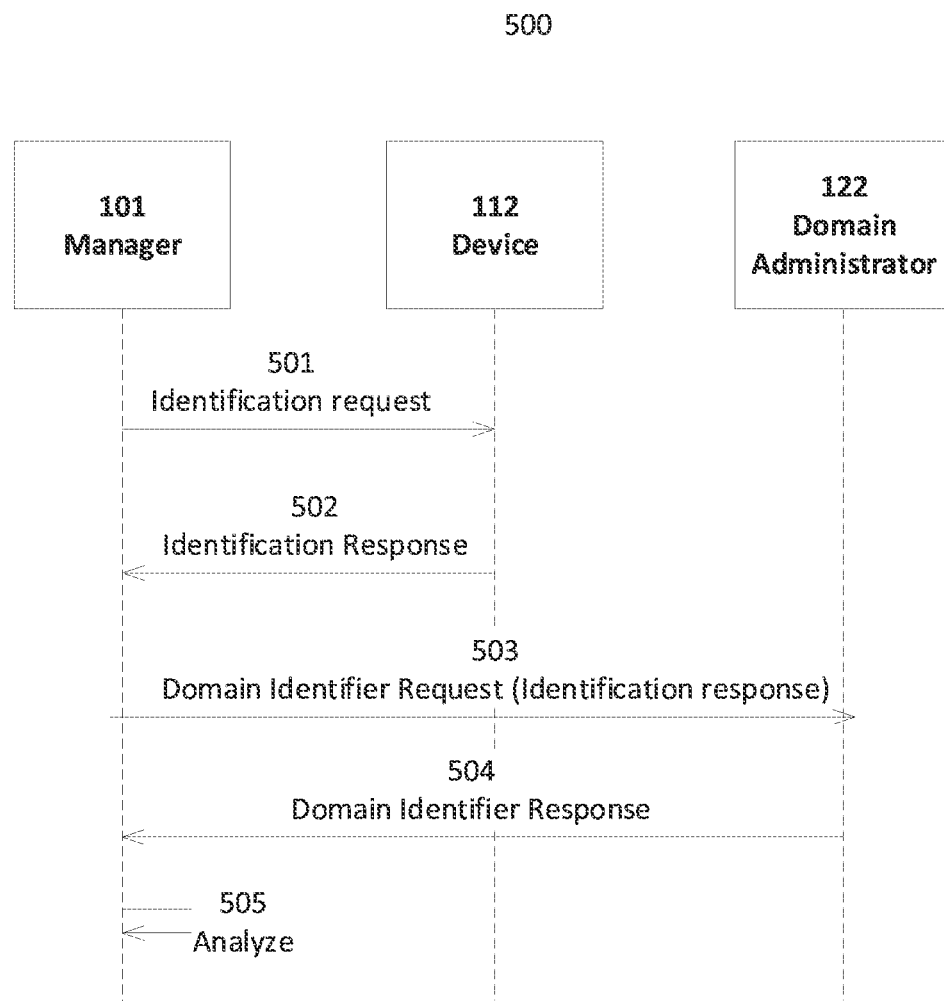
FIG. 5 is a sequence diagram of an optional flow of operations, according to some embodiments of the present invention.

Optionally, manager 101 communicates with at least one domain administrator to determine the new domain device identifier. Reference is now made also to FIG. 5, showing a sequence diagram of an optional flow of operations 500, according to some embodiments of the present invention. In such embodiments, instructing execution of the domain identification query on device 112 optionally comprises flow of operations 500. In 501, manager 101 optionally sends device 112 at least one identification request message, and in 502 device 112 optionally sends manager 101 an identification response message in response to the at least one identification request message. In 503, manager 101 optionally sends domain administrator 122 a domain identifier request, optionally comprising at least part of the identification response message and in 504 domain administrator 122 optionally sends manager 101 a domain identifier response. Optionally, manager 101 analyzes the domain identifier response in 505 to determine the new domain device identifier.

Figure 6:
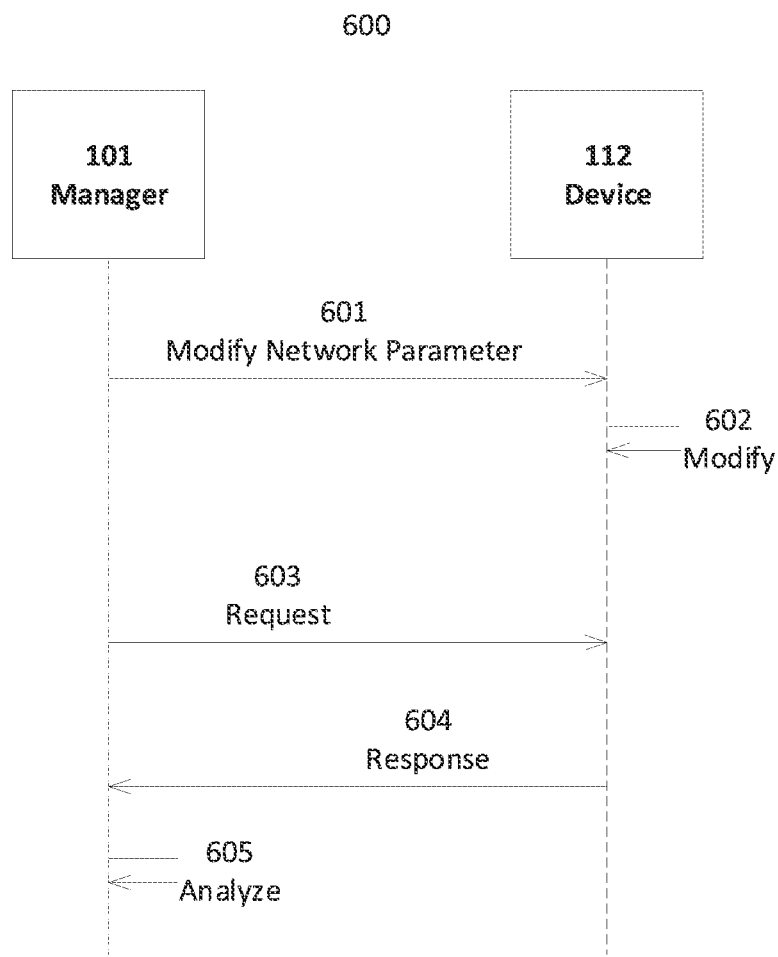
FIG. 6 is a sequence diagram of another optional flow of operations, according to some embodiments of the present invention.

Reference is now made again to FIG. 4. Optionally, manager 101 uses at least one network parameter value to determine the new domain device identifier. For example, manager 101 may set a Time To Live (TTL) value of adapter 112 to an identified TTL value associated with management domain 122 using a supported action according to management domain 122, and may send adapter 112 a request using another supported action according to management domain 121. When a response to the request comprises a TTL value less than the identified TTL value by no more than a predefined threshold difference value, manager 101 may determine the new domain device identifier is the identified TTL value associated with management domain 122. Reference is now made also to FIG. 6, showing a sequence diagram of another optional flow of operations 600, according to some embodiments of the present invention. In such embodiments, instructing execution of the domain identification query on device 112 optionally comprises flow of operations 600. In 601, manager 101 optionally sends device 112 an instruction to modify at least one network parameter value of device 112, for example a TTL value, and in 602 device 112 optionally modifies the at least one network parameter value. In 603, after sending the instruction in 601, manager 101 optionally sends device 112 at least one request message and in 604 device 112 optionally sends manager 101 at least one message comprising at least one response to the at least one request message. Optionally, in 605 manager 101 analyzes the at least one message, for example to extract at least one TTL value of the at least one message, for the purpose of determining the new domain device identifier.

Reference is now made again to FIG. 4. After determining the new domain device identifier, in 422 manager 101 optionally identifies in the plurality of device descriptors a second device descriptor 203, having a domain device identifier equal to the new domain device identifier, for example a domain device identifier associating device 112 with management domain 122 in domain specific set of data 233. In the non-limiting example above, manager 101 identifies device descriptor 203 as having the domain device identifier "AAA-222", and may thus associated device "221ABC" of management domain 221 with device "AAA-222" of management domain 222" Optionally, in 425, manager 101 merges device descriptor 202 with device descriptor 203.

Steps 410, 420, 422 and 425 are optionally repeated for each of the plurality of management domains not associated with device 112 in descriptor 202, until in 417 manager 101 optionally determines steps 410, 420, 422 and 425 were repeated for a last management domain. Step 401 is optionally repeated for each of the plurality of the plurality of device descriptors, followed by steps 410, 420, 422, 425 and 417, until in 409 manager 101 optionally determines steps 401, 410, 420, 422, 425 and 417 were repeater for a last device descriptor.

Optionally, manager 101 stores the plurality of device descriptors in non-volatile digital storage 105.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant supported actions and domain identification queries will be developed and the scope of the terms "supported action" and "domain identification query" are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for managing network connected devices, comprising at least one hardware processor adapted for:
    performing on one of a plurality of network connected devices a management operation in a management domain of a plurality of management domains by:
        computing a domain device identifier to associate the network connected device with the management domain, comprising:
            executing on the network connected device a first operation according to at least one first supported action, supported by the network connected device via another management domain of the plurality of management domains and not supported via the management domain, wherein the another management domain is different than the management domain, and at least one of:
communicating with a domain administrator of the management domain; and
executing on the network connected device a second operation according to at least one second supported action, supported by the network connected device via the management domain; and
performing the management operation by instructing execution on the network connected device of at least one operation according to at least one action, where the at least one action is supported by the network connected device via the management domain.

2. The system of claim 1, wherein executing on the network connected device the first operation is by sending at least one identification request message to the network connected device;
wherein communicating with the domain administrator of the management domain comprises sending to the domain administrator at least part of an identification response message received from the network connected device in response to the at least one identification request message; and
wherein the at least one hardware processor is further adapted for analyzing a domain identifier response received from the domain administrator in response to the at least part of the identification response message to determine the domain device identifier.

3. The system of claim 2, wherein the at least one hardware processor is further adapted for requesting at least one domain identification query software object from another domain administrator of the other administration domain; and
wherein sending the at least one identification request message to the network connected device comprises instructing the network connected device to execute the at least one domain identification query executable software object.

4. The system of claim 1, wherein executing on the network connected device the first operation comprises creating a new network interface object on the network connected device; and
wherein executing on the network connected device the second operation comprises configuring the new network interface object.

5. The system of claim 1, wherein executing on the network connected device the first operation comprises writing to a storage of the network connected device a file comprising at least one device identifier value of the network connected device in the second management domain; and
wherein executing on the network connected device the second operation comprises retrieving the file from the storage.

6. The system of claim 1, wherein the management domain is not the other management domain; and
wherein the at least one action is supported by the network connected device via the management domain and is not supported by the network connected device via the other management domain.

7. The system of claim 1, wherein the at least one first supported action is selected from a group of supported actions consisting of: retrieve a file from storage of a device, store a file on storage of a device, delete a file from storage of a device, execute a textual executable software object, execute a binary executable software object, and modify a hardware configuration;
wherein the at least one second supported action is selected from the group of supported actions; and
wherein the at least one action is selected from the group of supported actions.

8. The system of claim 1, wherein the at least one hardware processor is adapted for identifying the first supported action supported via the other management domain and the second supported action supported via the management domain allowing computing the domain device identifier.

9. The system of claim 1, further comprising at least one digital communication network interface connected to the at least one hardware processor; and
wherein the at least one hardware processor is adapted for instructing execution on the network connected device via the at least one digital communication network interface; and
wherein the at least one hardware processor is adapted for communicating with the domain administrator via the at least one digital communication network interface.

10. The system of claim 1, wherein the at least one hardware processor is further adapted for producing, for managing the plurality of network connected devices, a plurality of unique device descriptors, each describing one of the plurality of network connected devices, by:
for each of a plurality of device descriptors, each device descriptor describing one of the plurality of network connected devices, each device descriptor having one or more domain device identifiers, each identifier associating the device descriptor with one of the plurality of management domains, and each device descriptor having a plurality of supported actions, each of the plurality of supported actions supported by the respective network connected device described thereby via one of the plurality of management domains:
for each of the plurality of management domains not associated with the device descriptor:
generating an instruction to execute on the respective network connected device described by the device descriptor a domain identification query according to the descriptor's plurality of supported actions;
determining a new domain device identifier in at least one message received from the respective network connected device in response to the respective network connected device executing the domain identification query according to the descriptor's plurality of supported actions;
identifying in the plurality of device descriptors a second device descriptor having a domain device identifier equal to the new domain device identifier; and
reducing an amount of device descriptors in the plurality of device descriptors describing the network connected device by merging the device descriptor with the second device descriptor.

11. The system of claim 10, wherein the at least one first supported action is one of the plurality of supported actions of the respective device descriptor of the plurality of device descriptors describing the network connected device.

12. A method for managing network connected devices, comprising:
performing on one of a plurality of network connected devices a management operation in a first management domain of a plurality of management domains by:

computing a domain device identifier to associate the network connected device with the first management domain, comprising:
  executing on the network connected device a first operation according to a first supported action, supported by the network connected device via a second management domain of the plurality of management domains and not supported via the first management domain, wherein the second management domain is different than the first management domain, and at least one of:
    communicating with a domain administrator of the first management domain; and
    executing on the network connected device a second operation according to a second supported action, supported by the network connected device via the first management domain of the plurality of management domains; and
  performing the management operation by instructing execution on the network connected device of at least one operation according to a supported action, where the supported action is supported by the network connected device via the first management domain of the plurality of management domains.

13. A software program product for data retrieval, comprising:
  a non-transitory computer readable storage medium;
  program instructions for: performing on one of a plurality of network connected devices a management operation in a first management domain of a plurality of management domains by:
    computing a domain device identifier to associate the network connected device with the first management domain, comprising:
      executing on the network connected device a first operation according to a first supported action, supported by the network connected device via a second management domain of the plurality of management domains and not supported via the first management domain, wherein the second management domain is different than the first management domain, and at least one of:
        communicating with a domain administrator of the first management domain; and
        executing on the network connected device a second operation according to a second supported action, supported by the network connected device via the first management domain of the plurality of management domains; and
    performing the management operation by instructing execution on the network connected device of at least one operation according to a supported action, where the supported action is supported by the network connected device via the first management domain of the plurality of management domains;
  wherein the program instructions are executed by at least one computerized processor from the non-transitory computer readable storage medium.

* * * * *